US012673514B2

(12) United States Patent
Benton et al.

(10) Patent No.: US 12,673,514 B2
(45) Date of Patent: Jul. 7, 2026

(54) BORDERLESS BOARD PRINT PRODUCT AND METHOD OF MAKING THE SAME

(71) Applicant: FUJIFILM North America Corporation, Valhalla, NY (US)

(72) Inventors: Curtis Benton, Apollo Beach, FL (US); Patrick McCarthy, Wall, NJ (US)

(73) Assignee: FUJIFILM North America Corporation, Valhalla, NY (US)

( * ) Notice: Subject to any disclaimer, the term of this patent is extended or adjusted under 35 U.S.C. 154(b) by 0 days.

(21) Appl. No.: 18/750,409

(22) Filed: Jun. 21, 2024

(65) Prior Publication Data

US 2025/0019897 A1 Jan. 16, 2025

Related U.S. Application Data

(60) Provisional application No. 63/513,081, filed on Jul. 11, 2023.

(51) Int. Cl.
*B41M 5/50* (2006.01)

(52) U.S. Cl.
CPC .............. *B41M 5/508* (2013.01); *B41M 5/50* (2013.01)

(58) Field of Classification Search
CPC ........... B41M 5/508; B41M 5/50; B44D 3/18; B44D 5/0095; D21H 5/0095
USPC ........................................................ 428/32.1
See application file for complete search history.

(56) References Cited

U.S. PATENT DOCUMENTS

| | | | | |
|---|---|---|---|---|
| 5,730,826 A * | 3/1998 | Sieber | G09F 3/10 | 156/240 |
| 7,316,085 B1 * | 1/2008 | Freeman | G09F 1/06 | 40/454 |
| 2002/0050711 A1 * | 5/2002 | MacWilliams | B42F 21/02 | 283/62 |
| 2012/0297653 A1 * | 11/2012 | Ridless | B41M 5/52 | 40/773 |
| 2025/0019897 A1 * | 1/2025 | Benton | B41M 5/50 | |

* cited by examiner

*Primary Examiner* — Betelhem Shewareged
(74) *Attorney, Agent, or Firm* — Woods Oviatt Gilman LLP; Dennis B. Danella, Esq.

(57) ABSTRACT

A printable substrate for forming a borderless board print product including an image thereon is provided. The printable substrate comprises a printable board and a border. The printable board includes a front surface for including the image thereon, wherein the front surface is defined by at least one side edge. The border is removably coupled to the at least one side edge of the front surface of the printable board. The border is removably coupled to the printable board using perforations.

20 Claims, 5 Drawing Sheets

BORDERLESS BOARD PRINT PRODUCT AND METHOD OF MAKING THE SAME

FIELD OF THE INVENTION

The present invention generally relates to print products and more specifically to borderless board print products.

BACKGROUND OF THE INVENTION

Borderless board print products are currently available in the marketplace using a combination of commercially available board print materials. A borderless board print product typically includes a silicone coating on a back surface thereof and a release liner (i.e., print carrier). The silicone coating attaches the release liner to the board and allows the print carrier to be released from the board after printing. The print carrier is required to allow for overspray when printing an image on a front board print layer of the board because most wide format printers do not allow for printing edge-to-edge or “full bleed” printing.

Using the current methods and devices for producing the borderless board print, the borderless board print product is subject to warping and curling as a result of inconsistent reactions between the board print layer and the silicon coating which is applied to the back surface of the board. Due to these two surfaces responding differently to environmental variables, such as temperature and humidity, current borderless board print products may not remain flat.

Additional problems involve the desire to apply a finishing treatment to the back surface of the board, which may include a hanger or an easel. However, due to the silicon layer applied to the back surface of the currently available board print, one cannot adequately adhere these finishing treatments to the back surface of the board.

Thus, a need exists for improved borderless board print products and methods of producing the same that address the warping and curling of the board during production, as well as allow for finishing treatments to be applied to the back surface of the board.

SUMMARY OF THE INVENTION

The invention addresses the above-referenced needs as well as other needs by providing a printable substrate for forming a borderless board print product including an image thereon. In one aspect, the printable substrate comprises a printable board and a border. The printable board includes a front surface for including the image thereon, wherein the front surface is defined by at least one side edge. The border is removably coupled to the at least one side edge of the front surface of the printable board using micro-perforations.

The at least one edge may include a top edge and a bottom edge opposite the top edge, wherein the border is removably coupled to the top edge and the bottom edge. The at least one edge may further comprise opposite side edges, wherein the border is removably coupled to the side edges using perforations. Both of the side edges may include first and second ends, wherein the top edge intersects the first ends of the side edges at a first point and a second point, respectively, and wherein the bottom edge intersects the second ends of the side edges at a third point and a fourth point, respectively. In accordance with another aspect, the perforations at the top edge may extend a first distance beyond the first and second points, and the perforations at the bottom edge may extend a second distance beyond the third and fourth points, wherein the first and second distances may be equal. Further, the perforations at the third edge may extend a third distance beyond the first and second points, and the perforations at the fourth edge may extend a fourth distance beyond the third and fourth points, wherein the third and fourth distances may be equal. Also, the third distance may be equal to the first distance, and the fourth distance may be equal to the second distance. The printable substrate may have a thickness of 1 mm to 2 mm. In preferred embodiments, the printable substrate 10 may have a thickness of about 1.3 mm to about 1.4 mm.

In another aspect, a method of producing a borderless board print product is provided. The method comprises providing a printable substrate, wherein the printable substrate includes a printable board without a silicon coating and a border removably coupled to at least one edge of the printable board; printing an image on the printable board and at least a portion of the border; and separating the border from the printable board including the image, resulting in a borderless board print product. The border may be removably coupled to the printable board by a plurality of micro-perforations formed at the at least one edge, and wherein separating the border from the printed board comprises separating the border from the printed board at the plurality of micro-perforations.

Numerous applications, some of which are exemplarily described below, may be implemented using the present invention.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein.

Figure 1:
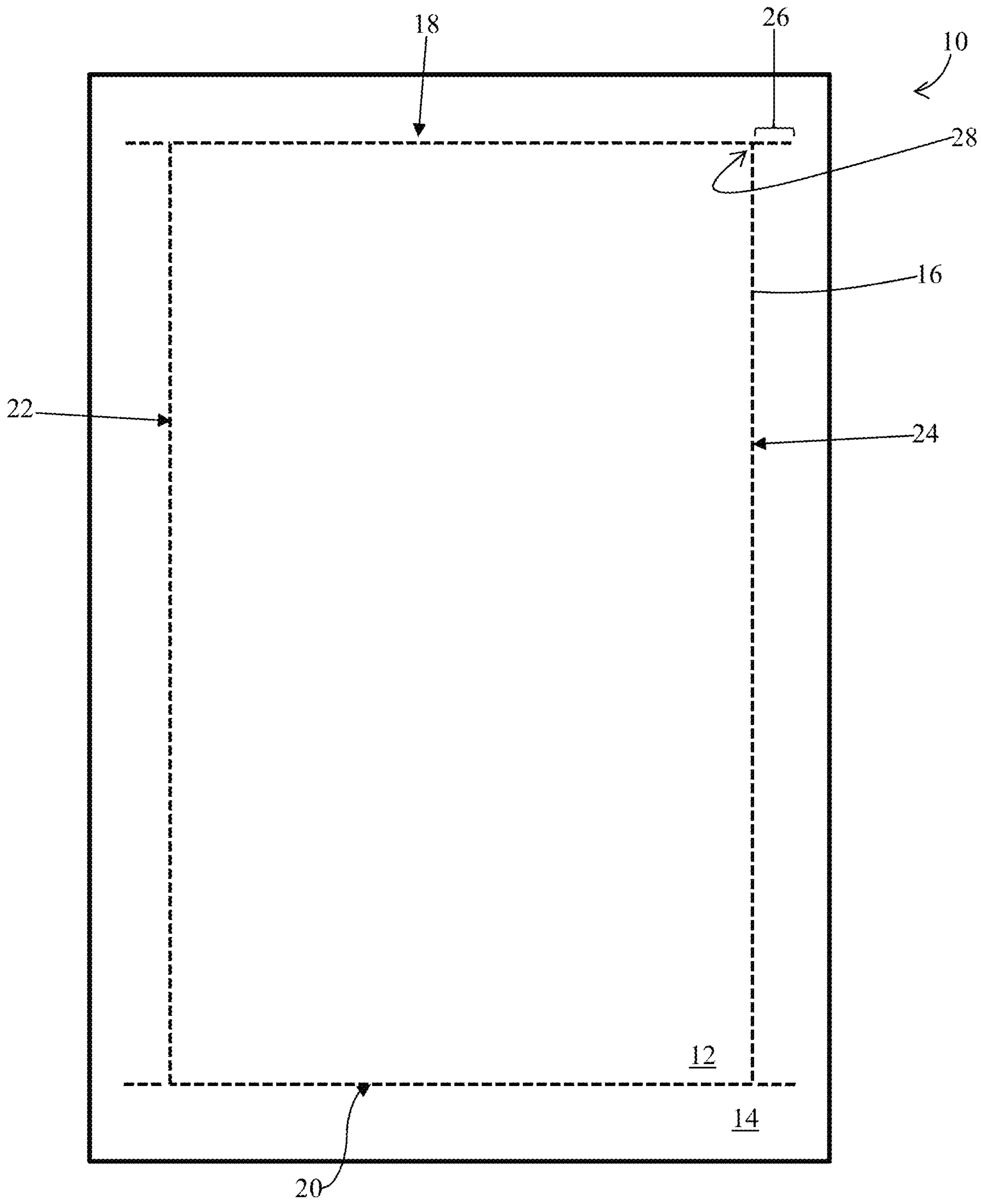
FIG. 1 depicts one example of a printable substrate, in accordance with one or more aspects of the present invention.

Corresponding reference characters indicate corresponding parts throughout the several views. The embodiments set out herein are examples only and illustrate currently preferred embodiments of the present invention, and such examples are not to be construed as limiting the scope of the invention in any manner.

DETAILED DESCRIPTION

The invention addresses the above-referenced need for improved borderless board print products and methods of producing the same using a border which is removably coupled to a printable board, for example, through the use of micro-perforations. The inclusion of the border provides a surface for the overspray that is generated through the printing of an image on a front surface of the printable board, thus eliminating the need for both a silicon layer and a release liner. Further, by eliminating the silicon layer or coating, the borderless board print product produced does not warp or curl and finishing treatments can be applied to a back surface of the borderless print product. As used herein, the "micro" portion of "micro-perforations" should not be read to indicate any specific size of perforations. In addition, the actual method and machinery used to perforate the printable substrate forms no part of the present invention.

FIG. 1 depicts one example of a printable substrate 10, in accordance with one or more aspects of the present invention. Printable substrate 10 may include, for example, a printable board 12 without a silicon coating and a border 14 removably coupled to printable board 12. The printable substrate 10 may have a thickness of 1 mm to 2 mm. In preferred embodiments, the printable substrate 10 may have a thickness of about 1.3 mm to about 1.4 mm. Border 14 distinguishes from available release liners in that border 14 is initially part of or integrated with printable board 12 prior to making border removable, e.g., by forming the micro-perforations. The aforementioned removable coupling may take the form of, for example, micro-perforations 16 formed inwardly of at least two opposite top and bottom edges of printable substrate 10, for example, a first edge 18 and a second edge 20 opposite first edge 18. First and second edges 18, 20 therefore form opposite top and bottom edges of printable board 12 after border 14 is removed. As shown in FIG. 1, the micro-perforations 16 may also be formed inwardly of left and right side edges of printable substrate 10, for example, a third edge 22 and a fourth edge 24 opposite third edge 22. While edges 18 and 20, and edges 22, 24, are shown as being parallel with one another, it should be understood that either or both sets of edges may be non-parallel with one another as will be described in further detail below.

Figure 4:
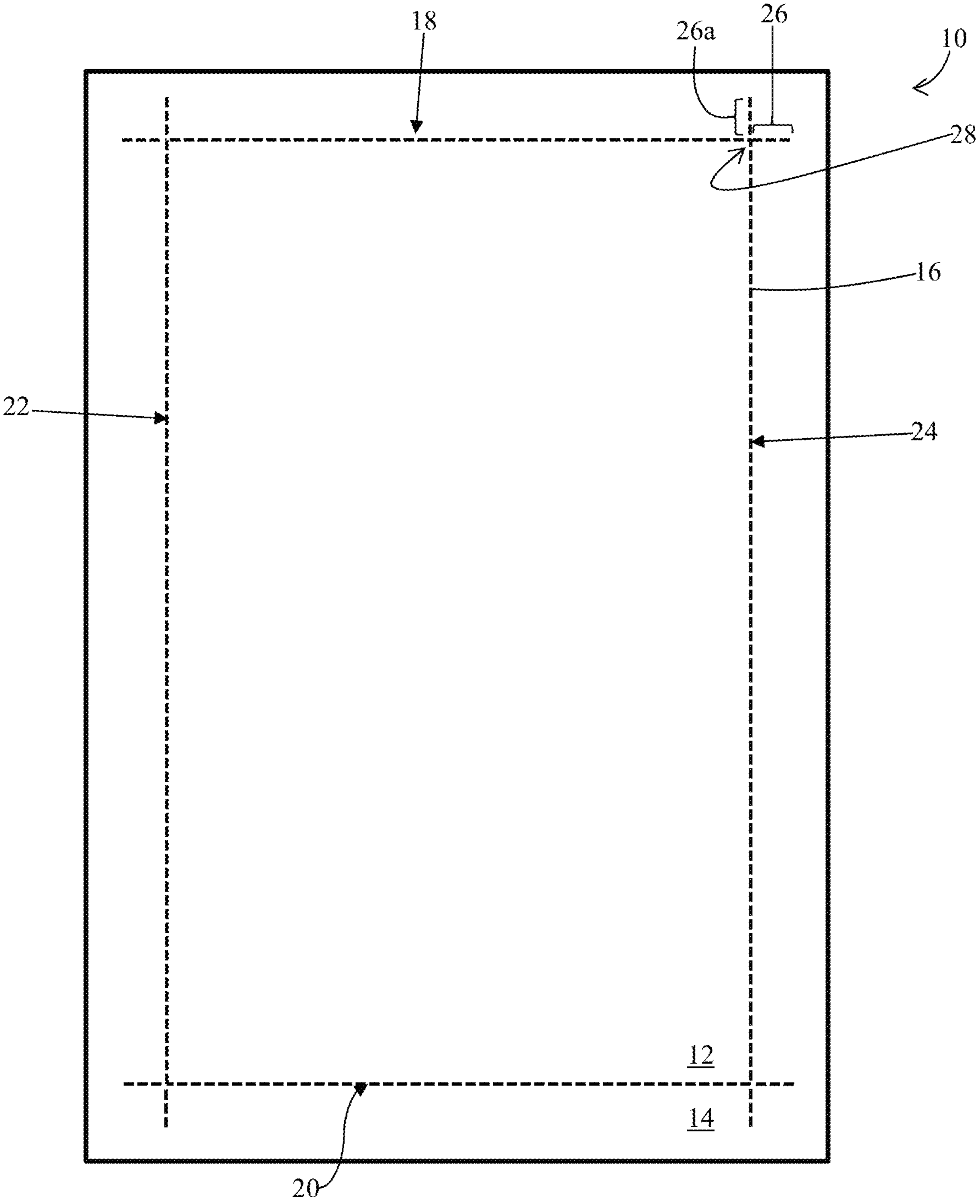
FIG. 4 depicts another example of a printable substrate, in accordance with one or more aspects of the present invention.

In some embodiments, where micro-perforations 16 run along all four edges of the printable board 12 (i.e., first edge 18 through fourth edge 24), micro-perforations 16 at first edge 18 and second edge 20 may extend in a horizontal direction an extended distance 26 beyond an intersection (e.g., intersection 28) of micro-perforations along third edge 22 and fourth edge 24. Similarly, micro-perforations 16 at third edge 22 and fourth edge 24 may extend in a vertical direction an extended distance **26*a* beyond an intersection (e.g., intersection 28) of micro-perforations along first edge 18 and second edge 20. Further, micro-perforations 16 may extend an extended distance 26, 26*a* beyond an intersection (e.g., intersection 28) in both a horizontal direction and a vertical direction as seen in FIG. 4. It should be understood that extended distance 26 and extended distance 26*a* may be equal to one another or different distances. Extended distance 26 may be, for example, about a quarter of an inch or about half an inch where border 14 has a width of about an inch. The sizing, shape and spacing of micro-perforations 16 are preferably such as to yield substantially smooth board edges, as perceived by consumers, after printing on printable board 12 and separating border 14 therefrom, described in more detail with respect to FIG. 2**. For example, Xerox Corporation and its certified vendors offer a proprietary perforation system or service with specially designed teeth to minimize dust creation when used in digital presses, the teeth numbering, for example, about 60 per inch, break rule perforation. However, it should be understood that this is just one example of perforating a printable substrate to create the border and other processes may be used, for example, a process with a different type, material, number and/or spacing of the teeth.

Although a shape of the printable board 12 and/or border 14 is shown herein as a rectangle, this merely reflects standard print sizes. It will be understood that the shape of printable board 12 and/or non-release border 14 could be other shapes. For example, they could both be square shaped or other quadrilateral shapes capable of being accepted by a printer, for example, a wide-format printer. As another example, printable board 12 could be a standard shape and/or print size, while the outline of border 14 could be a different shape, so long as it can be accepted by a printer being used and extend an adequate distance beyond printable board 12 to allow for making it removable from printable board 12, for example, at least about half an inch. As still another example, printable board 12 and/or the outline of border 14 could be circular, spherical, triangular, etc., provided that the printer used can accommodate the shape or be made to accommodate the shape.

Figure 2A:
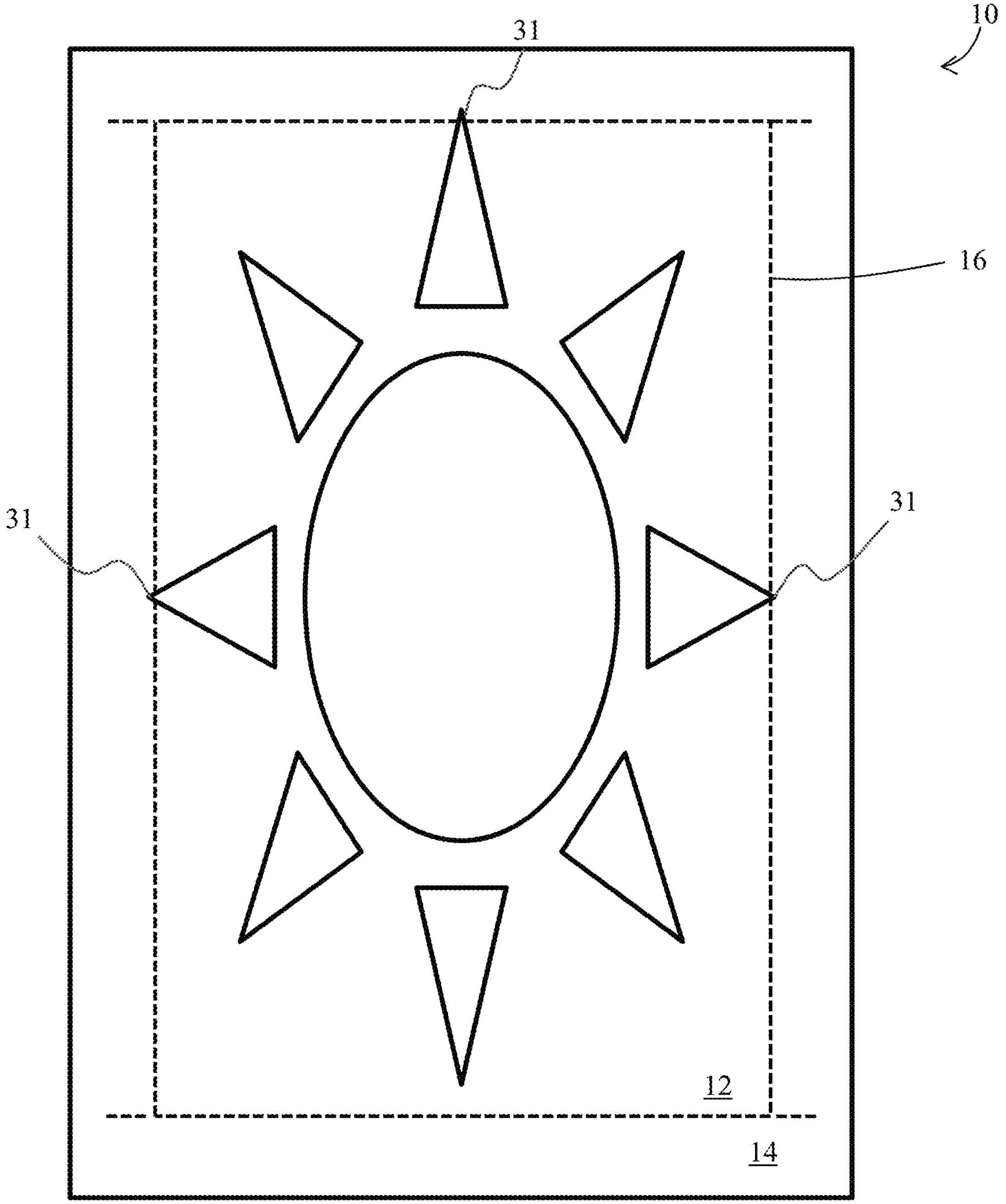
FIG. 2A depicts one example of the printable substrate of FIG. 1 including a printable board after printing an image thereon and before separation of the border in accordance with one or more aspects of the present invention.

FIG. 2A depicts one example of printable substrate 10 of FIG. 1 including printable board 12 after printing an image 30 (in this example, a graphical design of the sun) thereon and before separation of border 14 in accordance with one or more aspects of the present invention. As can be seen, a certain amount of overspray 31 is present in border 14, which may at least in part be as a result of the limitations of the printer used to dispose image 30 on printable substrate 10. It should be understood that the use of the term "image" herein may include a graphical design, photograph, text, numbers, symbols, and the like, and any combination thereof.

Figure 2B:
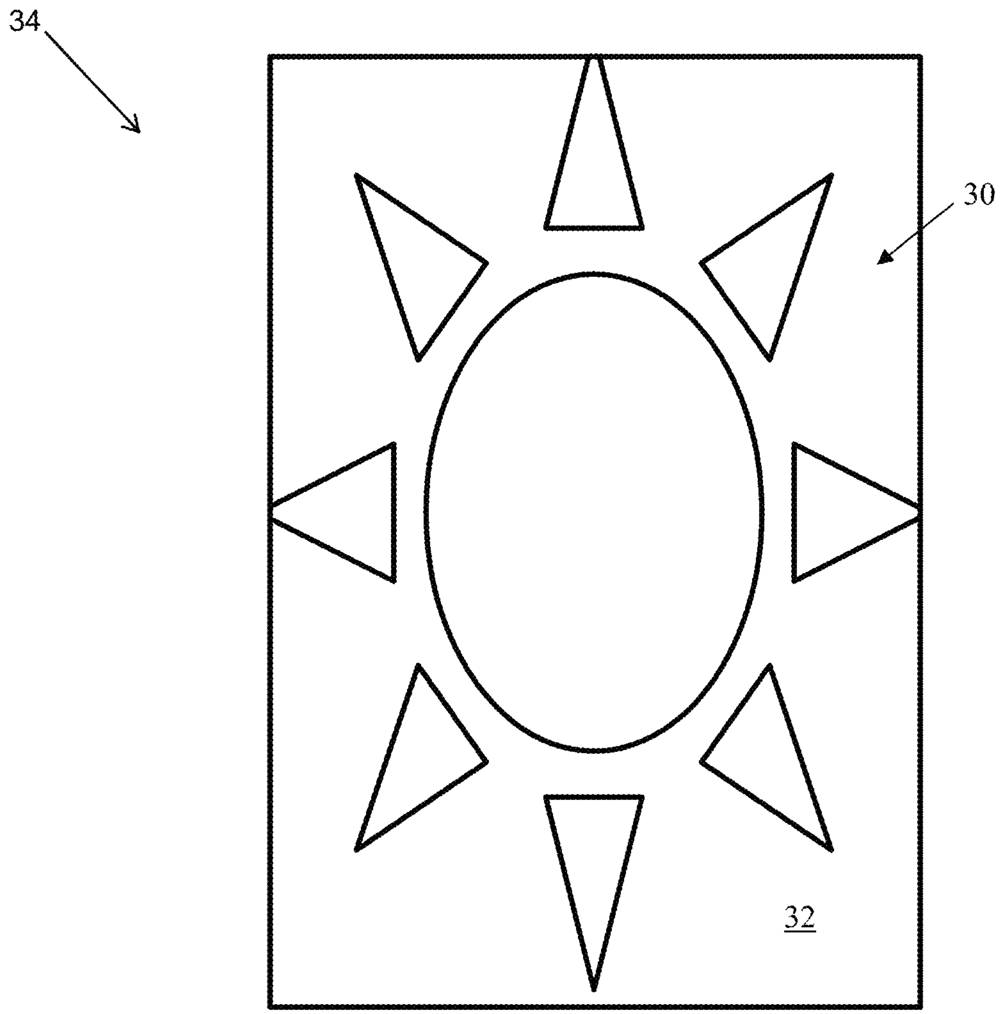
FIG. 2B depicts the printable substrate of FIG. 2A after printing and separation of the border, resulting in a borderless board print product, in accordance with one or more aspects of the present invention.

FIG. 2B depicts one example of printable substrate 10 of FIG. 1 after printing, for example, image 30, onto printable board 12, resulting in a printed board 32, and after separation of border 14 from printed board 32, in accordance with one or more aspects of the present invention. Once border 14 is separated from printed board 32, a borderless board print product 34 is produced without the need to include a silicone backing or release liner. The ability to produce the borderless board print product without a silicone backing not only avoid warping on the edges, but also allows a finishing treatment to be affixed thereto, such as, but not limited to, hangers and easels.

Figure 3:
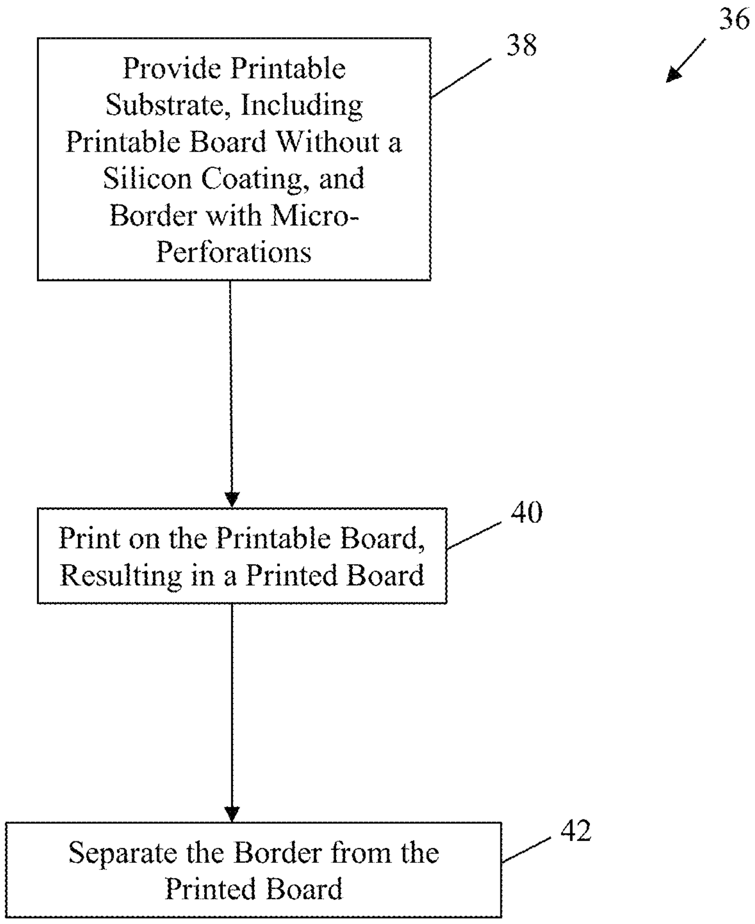
FIG. 3 is a flow diagram for one example of a method of producing a borderless board print product, in accordance with one or more aspects of the present invention.

FIG. 3 is a flow diagram 36 for one example of a method of producing a borderless board print product, in accordance with one or more aspects of the present invention. The method may include, for example, a step 38 of providing a printable substrate 10 as described above with respect to FIG. 1. The method may also include, for example, printing an image on printable board 12, resulting in a printed board at step 40. In printing the image on the printable board 12, there may be a certain amount of overspray on border 14 due to the limitations of the printer being used. Although a graphical design (i.e., sun) is used as a print example herein, it will be understood that, for example, other subjects of the print and other types of prints could be used, all of which is referred to herein as an image. The method may further include, for example, separating border 14 from the printed board at the perforations 16 to remove the aforementioned overspray from the printable substrate, resulting in a borderless board print product at step 42.

Those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A printable substrate for forming a borderless board print product including an image thereon, the printable substrate comprising:

i) a printable board including a front surface for including the image thereon, wherein the printable board is defined by:

a first side edge;

a second side edge opposite of the first side edge;

a third side edge including a first end and a second end, wherein the first side edge intersects the first end of the third side edge at a first point, and wherein the second side edge intersects the second end of the third side edge at a second point; and a fourth side edge opposite of the third side edge, wherein the fourth side edge includes a first end and a second end, wherein the first side edge intersects the first end of the fourth side edge at a third point, and wherein the second side edge intersects the second end of the fourth side edge at a fourth point; and ii) a border including an outer peripheral edge, wherein the border is removably coupled to the first side edge, the second side edge, the third side edge, and the fourth side edge of the printable board using perforations, iii) a first extended perforation portion extending a first distance from the first point, into the border, toward the outer peripheral edge of the border, without reaching the outer peripheral edge of the border;

iv) a second extended perforation portion extending a second distance from the second point, into the border, toward the outer peripheral edge of the border without reaching the outer peripheral edge of the border;

v) a third extended perforation portion extending a third distance from the third point, into the border, toward the outer peripheral edge of the border, without reaching the outer peripheral edge of the border; and vi) a fourth extended perforation portion extending a fourth distance from the fourth point, into the border, toward the outer peripheral edge of the border, without reaching the outer peripheral edge of the border.

2. The printable substrate in accordance with claim 1, wherein the first distance and the second distance are equal, and wherein the third distance and the fourth distance are equal.

3. The printable substrate in accordance with claim 1, wherein the border has a width of about an inch, and wherein at least one of the first distance, and the second distance, the third distance, and the fourth distance is about a quarter of an inch.

4. The printable substrate in accordance with claim 1, wherein the border has a width of about an inch, and wherein at least one of the first distance, and the second distance, the third distance, and the fourth distance is about half an inch.

5. The printable substrate in accordance with claim 1 further comprising:

vii) a fifth extended perforation portion extending a fifth distance from the first point, into the border, toward the outer peripheral edge of the border, without reaching the outer peripheral edge of the border, wherein the fifth extended perforation portion is perpendicular to the first extended perforation portion;

viii) a sixth extended perforation portion extending a sixth distance from the second point, into the border, toward the outer peripheral edge of the border, without reaching the outer peripheral edge of the border, wherein the sixth extended perforation portion is perpendicular to the second extended perforation portion;

ix) a seventh extended perforation portion extending a seventh distance from the third point, into the border, toward the outer peripheral edge of the border, without reaching the outer peripheral edge of the border, wherein the seventh extended perforation portion is perpendicular to the third extended perforation portion; and x) an eight extended perforation portion extending an eighth distance from the fourth point, into the border, toward the outer peripheral edge of the border, without reaching the outer peripheral edge of the border, wherein the eight extended perforation portion is perpendicular to the fourth extended perforation portion.

6. The printable substrate in accordance with claim 5, wherein the fifth distance and seventh distance are equal, and wherein the sixth distance and the eight distance are equal.

7. The printable substrate in accordance with claim 6, wherein the fifth distance is equal to the first distance, wherein the sixth distance is equal to the second distance, wherein the seventh distance is equal to the third distance, and wherein the eight distance is equal to the fourth distance.

8. The printable substrate in accordance with claim 1, wherein the printable board has a rectangular shape defined by the first side edge, the second side edge, the third side edge, and the fourth side edge.

9. The printable substrate in accordance with claim 1, wherein the printable substrate has a thickness of about 1.3 mm to about 1.4 mm.

10. The printable substrate in accordance with claim 1, wherein the border has a width of about an inch.

11. The printable substrate in accordance with claim 1, wherein the image is disposed on the printable board and the border.

12. The printable substrate in accordance with claim 1, wherein the first side edge is disposed at a perpendicular angle relative to the third side edge and the fourth side edge.

13. The printable substrate in accordance with claim 12, wherein the second side edge is disposed at a perpendicular angle relative to the third side edge and the fourth side edge.

14. The printable substrate in accordance with claim 1, wherein the first extended perforation portion and the second extended perforated portion are colinear with the third side edge.

15. The printable substrate in accordance with claim 14, wherein the third extended perforation portion and the fourth extended perforated portion are colinear with the fourth side edge.

16. The printable substrate in accordance with claim 5, wherein the first extended perforation portion and the second extended perforated portion are colinear with the third side edge, wherein the third extended perforation portion and the fourth extended perforated portion are colinear with the fourth side edge, wherein the fifth extended perforation portion and the seventh extended perforated portion are colinear with the first side edge, and wherein the sixth extended perforation portion and the eighth extended perforated portion are colinear with the second side edge.

17. The printable substrate in accordance with claim 16, wherein the first side edge is disposed at a perpendicular angle relative to the third side edge and the fourth side edge.

18. The printable substrate in accordance with claim 17, wherein the second side edge is disposed at a perpendicular angle relative to the third side edge and the fourth side edge.

19. The printable substrate in accordance with claim 1, wherein the printable substrate has a thickness of about 1 mm to about 2 mm.

20. The printable substrate of claim 1 wherein the first extended perforation portion, the second extended perforation portion, the third extended perforation portion, and the fourth extended perforation portion do not extend within the printable board defined by the first side edge, the second side edge, the third side edge, and the fourth side edge.

* * * * *